United States Patent [19]

Bloom

[11] Patent Number: 5,080,291
[45] Date of Patent: Jan. 14, 1992

[54] METHOD OF RECYCLING AUTOMOBILE WASTE RESIDUE

[76] Inventor: Dennis R. Bloom, 15458 Gougar Rd., Lockport, Ill. 60441

[21] Appl. No.: 428,758

[22] Filed: Oct. 30, 1989

[51] Int. Cl.[5] .............................................. B02C 23/00
[52] U.S. Cl. ........................................ 241/19; 241/24; 241/101 B; 241/DIG. 38
[58] Field of Search ................ 241/24, 19, DIG. 38, 241/101 B, 57, 18; 209/930; 366/101, 69, 96, 97, 98

[56]  References Cited

U.S. PATENT DOCUMENTS

| | | | |
|---|---|---|---|
| 3,524,594 | 8/1970 | Anderson et al. | 241/19 X |
| 3,702,682 | 11/1972 | Williams | 241/57 X |
| 3,848,813 | 11/1974 | Stancryk et al. | 241/19 |
| 3,892,706 | 7/1975 | Jetzer | 241/DIG. 38 X |
| 3,973,736 | 8/1976 | Nilsson | 241/DIG. 38 X |
| 4,065,282 | 12/1977 | Morey | 241/DIG. 38 X |
| 4,079,837 | 3/1978 | Grube et al. | 241/DIG. 38 X |
| 4,728,045 | 3/1988 | Tomaszele | 241/24 X |

FOREIGN PATENT DOCUMENTS

| | | | |
|---|---|---|---|
| 3535633 | 4/1987 | Fed. Rep. of Germany | 241/DIG. 38 |
| 0264621 | 2/1989 | Fed. Rep. of Germany | 241/DIG. 38 |
| 8401119 | 11/1985 | Netherlands | 241/DIG. 38 |

*Primary Examiner*—Mark Rosenbaum
*Assistant Examiner*—Frances Chin
*Attorney, Agent, or Firm*—Wood, Phillips, Mason, Recktenwald & Van Santen

[57]  ABSTRACT

A method of recycling automobile waste residue after major metal scrap has been separated therefrom. The residue includes such material as ferrous and non-ferrous metals, glass and fluff material including plastics. This residue is granulated and the ferrous and non-ferrous metals and glass are separated from the fluff material. The fluff material is fed to a mixing station whereat an amount of plastic material is added to the fluff material such that, when combined with the plastic material already in the fluff material, the resulting composition is on the order of a 50:50 ratio of plastic and non-plastic materials. This composition then is mixed and can be further processed to form a usable recycled product.

12 Claims, 1 Drawing Sheet

METHOD OF RECYCLING AUTOMOBILE WASTE RESIDUE

FIELD OF THE INVENTION

This invention generally relates to the area of automobile waste recovery and recycling and, particularly, to recycling automobile waste residue after major metal scrap has been separated therefrom.

BACKGROUND OF THE INVENTION

Waste management has become one of the most important problems facing today's society The problem of disposing of scrap or junk automobiles continues to be of critical concern. Since 1982, well in excess of 10,000,000 passenger cars, trucks and buses have been sold in the United States and Canada in an average per year.

Originally, old or non-usable automobiles simply were carted off to "junk yards" where attempts were made to salvage various usable components of the vehicle. Such facilities became such blots on the environment that automobile crushing machines were designed to compact an automobile in order to recycle its considerable metal composition. Before crushing, the automobiles often were burned to dispose of as much of the non-metallic components thereof as possible. However, this process resulted in considerable pollution of the air.

Consequently, automobile shredders were designed which mechanically tear the automobiles apart and separate them into two products, metallic auto scrap and residue. Usually, the motors, batteries and catalytic converters are removed before shredding. The metallic scrap is shipped to mills for remelting and the residue material usually was shipped off to a dump. However, these early systems became less and less efficient because of increasing energy considerations which required lighter vehicles to conserve fuel. This, in turn, resulted in automobiles being designed to reduce the amount of metal components and considerably increase the amount of non-metal or non-ferrous components. As a result, the amount of residue being dumped (versus the amount of meltable metal) became enormous and salvaging automobiles became considerably less profitable.

Automobile residue separation systems then were incorporated in recycling facilities. In some systems, what has been termed "fluff" in the industry has been air separated from the remaining metal in the residue product, resulting in recovering approximately 70-80% of the residue metals. The "fluff" again simply was dumped. Other systems, sometimes called heavy media separators, take the waste fluff, copper, aluminum, die cast metal and stainless steel and separate the material with a magnetic media of a specific gravity and which is controlled to first "float" the waste at a specific gravity of 1.5 or under and then float the waste at a specific gravity of 2.7-3.2 for floating aluminas. The remainder of the metals simply are hand picked. This latter system may recover as much as 95% of the residue material, by weight, but the 5% fluff is considerable by volume when considering the number of automobiles that must be disposed of each year.

This invention is directed to a method of recycling automobile waste residue wherein even the fluff material can be processed into a useful product. The fluff material itself consists of such automobile waste material components as cotton, rubber, mixed plastics, some glass and possible up to 5% metals.

SUMMARY OF THE INVENTION

An object, therefore, of the invention is to provide a method of recycling automobile waste residue after major metal scrap has been separated therefrom.

As stated above, the residue includes such materials as ferrous and non-ferrous metals, glass and fluff material including plastics. It should be understood that the description herein and the claims hereof use the term "automobile" which is intended to include cars, trucks, recreational vehicles, busses and the like which are susceptible of being run through shredding or other machines which remove the major metal scrap for remelting, but leaves an automobile waste residue.

The method contemplates various steps of reducing the particle size of the residue, magnetically removing ferrous material from the residue, removing glass, copper and aluminum from the residue, and, during these various steps, separating the remaining fluff material, including some plastic material, and feeding the fluff material to a station which combines additional plastic material for processing into a usable recycled product.

More particularly, the exemplary embodiment of the invention shows one or more granulating stations whereat the particle size of the residue is reduced. Ferrous material then is magnetically removed from the remaining residue. That remaining residue is fluidized at a specific gravity to remove non-metallic materials such as glass therefrom. The remaining residue is fluidized a second time to separate copper and aluminum into by-products. During or after these various steps, fluff material is air separated from the residue, such as during the granulating and magnetic removal steps and at least after the fluidizing steps.

The separated fluff material then is fed to a mixing station. At that station, an amount of plastic material is added to the fluff material such that, when combined with the plastic material already in the fluff material, the resulting composition is on the order of a 50:50 ratio of plastic and non-plastic materials. This composition then can be mixed, heated and extruded or otherwise processed to form a recycled product. The cotton fibers of the fluff material adds resiliency to the plastics to make the product more flexible, pliable and durable as a substitute for many wood products, for instance.

Other objects, features and advantages of the invention will be apparent from the following description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

The invention contemplates a method of recycling automobile waste residue after major metal scrap has been separated therefrom as by vehicle shredders. This waste residue includes such materials as ferrous and non-ferrous metals, glass and fluff material including plastics. Because of the nature of automobile construction, the plastics are called commingled plastic waste of different plastic compositions, such as polyethylene, polypropylene, polyvinyl, polyvinylacetate, polyurethane, nylon and the like. This best can be understood by comparing the soft seat cushions an automobile, versus hard door handles, pliable bumpers, and the like.

Generally, the method contemplates reducing the particle size of the waste residue, then separating the ferrous and non-ferrous metals and glass from the residue, resulting in a fluff material to which additional plastic material is added. This resulting composition then is mixed for processing into a recycled usable product capable of many uses, such as various substitutes for wood products, even including railroad ties.

Figure 1:
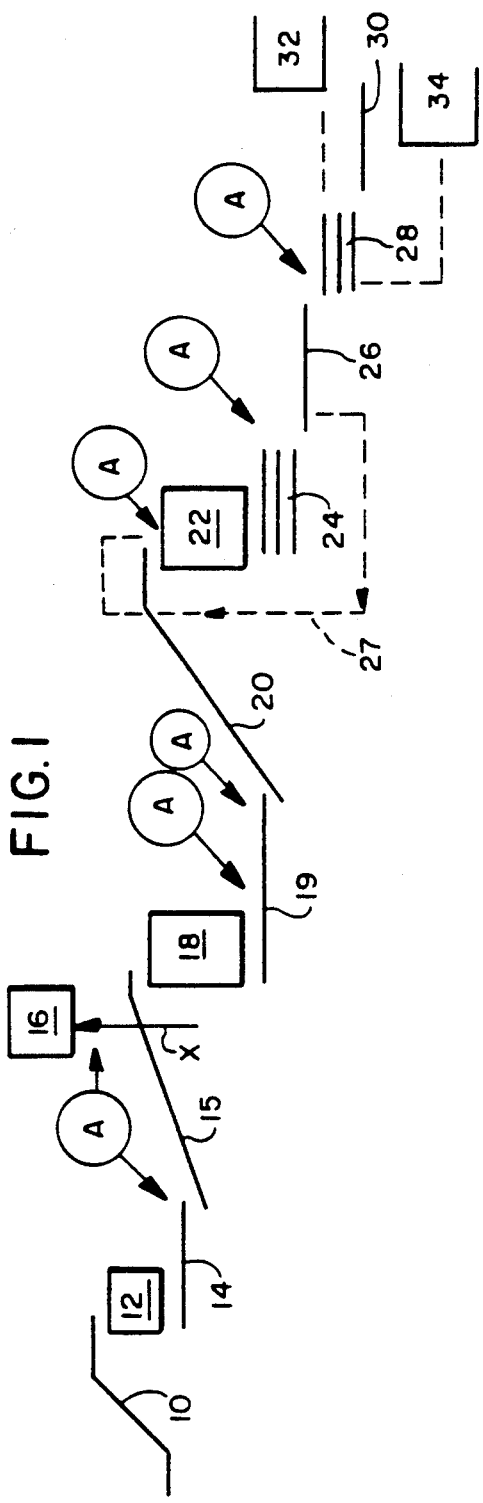
FIG. 1 is a schematic illustration of the separation steps involved in an embodiment of the method of the invention.

FIG. 1 schematically illustrates various stations corresponding to steps of the inventive method for sizing the residue and removing such materials as ferrous and non-ferrous metals and glass from the recyclable fluff material.

In this example, the automobile waste residue, after the major metal scrap has been separated therefrom, is fed by an infeed conveyor 10 to a first or primary granulator 12. This granulator mixes the residue and reduces the particle size to on the order of two inches and smaller.

The remaining residue material then is fed by conveyors 14 and 15 beneath a magnetic separator 16 which removes ferrous material therefrom, as indicated by arrow "X".

The remaining residue material then is fed by conveyor 15 to a secondary granulator 18 which further reduces the particle size to on the order of one inch and smaller.

The remaining material then is fed by conveyors 19 and 20 to a tertiary granulator 22 wherein the particle size is reduced still further to on the order of one-half inch.

Throughout the various granulating and magnetic removal steps described above, fluff material is separated by air jets at various points as indicated by arrows emanating from locations "A". The fluff is blown to a common conveyor (not shown) whereby the fluff material can be fed to a processing station, described hereinafter. In essence, the air blows lighter fluff away from the heavier metals and glass.

After tertiary granulation at station 22, the remaining residue material is further particle sized by a sizing screen 24 and fed to a fluidized bed 26 to separate glass and rock from remaining metal materials by known specific gravity principles. Dashed line 27 indicates an oversize return for resizing, if desired.

The remaining residue material is properly sized by a second sizing screen 28 and then is fed to a second fluidized bed 30 whereat copper and aluminum are separated by known specific gravity principles. The separated copper and aluminum, as at 32 and 34, respectively, comprise useful saleable by-products.

As with the granulating and magnetic removal steps or stations, fluff material is removed during the remaining sizing and fluidizing steps as indicated by additional arrows emanating from further locations "A" at the right-hand portions of FIG. 1. This fluff material, likewise, is fed to a common conveyor to a processing station described hereinafter.

The various apparatus for carrying out the above-described separation and recovery steps may be obtained from various manufacturers. Of course, conveyors 10, 14, 15, 19, 20 and others not shown can be obtained from various manufacturers and can be belt conveyors, vibratory conveyors and the like. An appropriate primary granulator 12 can be obtained from American Pulverizer of St. Louis, Missouri. Magnetic separator 16 can be a magnetic cross belt, for instance, manufactured by Eriz Magnetics of Chicago, Illinois. Secondary granulator 18 may be of the type manufactured by Triple/S Dynamics of Dallas, Texas, as is also applicable to tertiary granulator 22. Fluidized beds 26 and 30 also can be obtained from Triple/S Dynamics, along with sizing screens 24 and 28.

Figure 2:
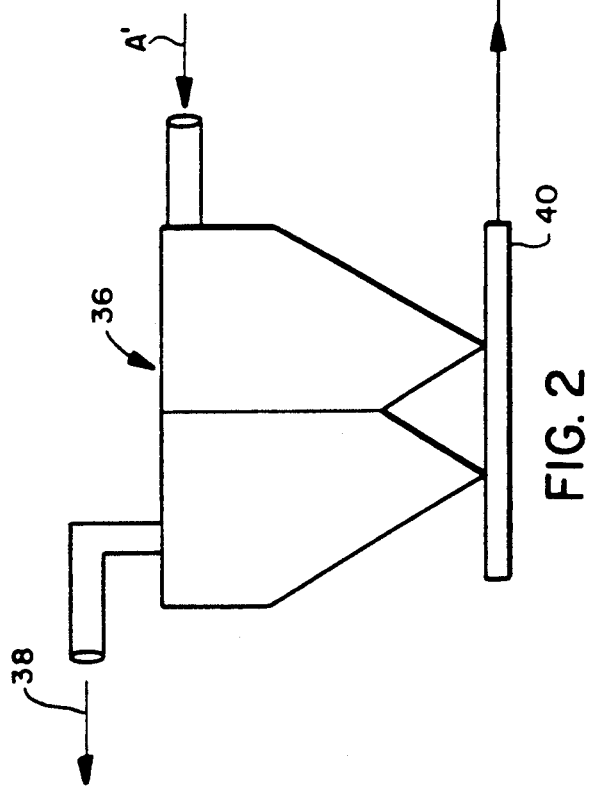
FIG. 2 is a schematic illustration of a station for mixing additional plastic material to the fluff separated by the method exemplified in FIG. 1.

FIG. 2 schematically shows, by arrow "A-prime", where the air separated fluff from the processing of FIG. 1 is fed to a collection hopper assembly 36 wherein the fluff material collects and air continues through the tops of the hopper assembly, as at 38, to a filter (not shown). A screw conveyor 40 is disposed at the bottom of hopper assembly 36 and wherein the fluff material is transported, as indicated by line 42, to a mixing and compacting station 44. As stated above, with all of the various ferrous, nonferrous and glass materials separated by the processing described in relation to FIG. 1, the remaining material which reaches hopper assembly 36 and mixing station 44 consists primarily of cotton, rubber and commingled plastic waste. There still may be on the order of 1-1.5% ferrous and non-ferrous material in this residue, but this amount is well within acceptable ranges for purposes of removal efficiency and the composition of the final product.

At mixing station 44, additional plastic material is added to the fluff material, as indicated by arrow "B" such that, when combined with the plastic material already in the fluff material, the resulting composition is on the order of a 50:50 ratio of plastic and non-plastic materials. The amount of added plastic, of course, will vary and easily can be determined by continuous monitoring and sampling. This variance best can be understood by comparing contemporary automobiles with automobiles a few years ago. Older automobiles will have very few plastic components. However, contemporary automobiles not only use plastic material for seats, dashboards, door handles, steering wheels, trim components and the like, but more and more components such as bumpers, grills and fenders are being fabricated of plastics.

The mixed "50:50" composition then can be fed, as at 46, from mixing station 44 to other stations for appropriate processing. For instance, the composition can be melted at a station 48 to form a fluid flowable copolymer plastic and cotton product which then can be extruded, as at 50, or molded, injected or cast to a final saleable product having superior cold strength. The cotton fiber adds resiliency to the plastic material of the composition and, the product is more flexible, pliable and durable than wood products themselves.

From the foregoing, it can be seen that a novel method or process is provided wherein substantially the entirety of an automobile is salvaged, using even the voluminous cotton and plastic materials which heretofore have been discorded and dumped to costly landfills.

I claim:

1. A method of recycling particles of automobile waste residue after major metal scrap has been separated therefrom, the residue including such materials as ferrous and non-ferrous metals, glass and fluff material including plastics, comprising the steps of:
   granulating the residue to reduce the particle size thereof;
   air separating fluff material from the residue during the granulating step;
   magnetically removing ferrous material from the residue;
   air separating fluff material from the residue during the magnetic removal step;
   fluidizing the residue a first time to remove nonmetallic materials such as glass therefrom;
   air separating fluff material from the residue after the first fluidizing step;
   fluidizing the residue a second time to separate copper and aluminum into by-products;
   air separating fluff material from the residue after the second fluidizing step;
   feeding the fluff material separated by said air separating steps to a mixing station; and
   adding at said mixing station an amount of plastic material to the plastic material contained in the fluff material to form a combination such that the combination of the plastic material already in the fluff material and the additional plastic material result in a composition on the order of a 50:50 ratio of plastic and non-plastic materials whereby the composition can be further processed to form a usable product.

2. A method of recycling particles of automobile waste residue as set forth in claim 1 further including the step of continuously monitoring said composition at said mixing station to assure that said composition is on the order of a 50:50 ratio of plastic and non-plastic materials.

3. A method of recycling particles of automobile waste as set forth in claim 1 wherein the step of air separating fluff material from the residue occurs after the granulating step and the step of air separating fluff material from the residue occurs after the magnetic removal step.

4. The method of recycling particles of automobile waste as set forth in claim 1 wherein the step of air separating fluff materials from the residue occurs during and after the granulating step and the step of air separating fluff material from the residue occurs during and after the magnetic removal step.

5. A method of recycling particles of automobile waste residue after major metal scrap has been separated therefrom, the residue including such materials as ferrous and non-ferrous metals, glass and fluff material including plastics, comprising the steps of:
   granulating the residue to reduce the particle size thereof;
   magnetically removing ferrous material from the residue;
   fluidizing the residue a first time to remove non-metallic materials such as glass therefrom;
   fluidizing the residue a second time to separate copper and aluminum into by-products;
   air separating fluff material from the residue at various locations during at least some of the above steps;
   feeding the fluff material separated by said air separating steps to a mixing station; and
   adding an amount of plastic material to the fluff material at said mixing station such that, when combined with the plastic material already in the fluff material, the resulting composition is on the order of a 50:50 ratio of plastic and non-plastic materials whereby the composition can be further processed to form a usable product.

6. A method of recycling particles of automobile waste residue as set forth in claim 5 further including the step of continuously monitoring said composition at said mixing station to assure that said composition is on the order of a 50:50 ratio of plastic and non-plastic materials.

7. The method of recycling particles of automobile waste as set forth in claim 5 wherein the step of air separating fluff material from the residue at various locations occurs after at least some of the above steps.

8. The method of recycling particles of automobile waste residue as set forth in claim 5 wherein the step of air separating fluff material from the residue at various locations occurs during and after at least some of the above steps.

9. A method of recycling particles of automobile waste residue after major metal scrap has been separated therefrom, the residue including such materials as ferrous and non-ferrous metals, glass and fluff material including plastics, comprising the steps of:
   granulating the residue to reduce the particle size thereof;
   air separating fluff material from the residue during the granulating step;
   magnetically removing ferrous material from the residue;
   air separating fluff material from the residue during the magnetic removal step;
   feeding the fluff material separated by said air separating steps to a mixing station; and
   adding an amount of plastic material to the fluff material at said mixing station such that, when combined with the plastic material already in the fluff material, the resulting composition is on the order of a 50:50 ratio of plastic and non-plastic materials whereby the composition can be further processed to form a usable product.

10. A method of recycling particles of automobile waste residue as set forth in claim 9 further including the step of continuously monitoring said composition at said mixing station to assure that said composition is on the order of a 50:50 ratio of plastic and non-plastic materials.

11. The method of recycling particles of automobile waste residue as set forth in claim 9 wherein the step of air separating fluff material from the residue occurs after the granulating step and the step of air separating fluff material from the residue occurs after the magnetic removal step.

12. The method of recycling particles of automobile waste residue as set forth in claim 9 wherein the step of air separating fluff material from the residue occurs during and after granulating and magnetic removal steps.

* * * * *